United States Patent
Rubin (12)

(10) Patent No.: US 6,234,805 B1
(45) Date of Patent: May 22, 2001

(54) APPARATUS ILLUSTRATING VISION DISORDERS AND CONDITIONS

(76) Inventor: Bruce Rubin, 120 Lucerne Blvd., Cherry Hill, NJ (US) 08003

( * ) Notice: Subject to any disclaimer, the term of this patent is extended or adjusted under 35 U.S.C. 154(b) by 0 days.

(21) Appl. No.: 09/576,553

(22) Filed: May 24, 2000

(51) Int. Cl.[7] .................................................. G09B 23/28
(52) U.S. Cl. ............................................ 434/271; 351/245
(58) Field of Search .................................... 351/205, 216, 351/217, 218, 203, 239, 243, 244, 245, 246, 221; 434/271

(56) References Cited

U.S. PATENT DOCUMENTS

| | | |
|---|---|---|
| 1,476,621 | 12/1923 | Kintner . |
| 1,722,518 | 7/1929 | Desmond . |
| 1,832,603 | 11/1931 | Witt . |
| 2,136,735 | 11/1938 | Dunn .......................................... 35/17 |
| 3,177,593 | 4/1965 | Loeb .......................................... 35/17 |
| 3,905,130 | 9/1975 | Gordon et al. ............................ 35/17 |
| 4,943,151 | 7/1990 | Cushman ................................ 351/203 |
| 4,997,269 | * 3/1991 | Cushman ................................ 351/203 |
| 5,221,208 | 6/1993 | Alexander .............................. 434/271 |
| 5,223,866 | * 6/1993 | Cushman ................................ 351/243 |
| 5,450,145 | * 9/1995 | Valentine .............................. 351/243 |

FOREIGN PATENT DOCUMENTS

| | | | |
|---|---|---|---|
| 3146023 | 5/1983 | (DE) | ........................................ 23/32 |
| 4313031 | 10/1994 | (DE) | ........................................ 23/28 |
| 2228688 | 9/1990 | (JP) | ........................................ 23/28 |

* cited by examiner

*Primary Examiner*—George Manuel
(74) *Attorney, Agent, or Firm*—Richard C. Litman

(57) ABSTRACT

An improved ocular device used to illustrate common ocular disorders such as nearsightedness, farsightedness, astigmatism and presbyopia. The device includes a light source that forms an optical axis across the length of the device and is subjected to a slide holder and a focusing mechanism. The slide holder exposes an inverted image to the light source, which is then exposed to a corneal lens and vernier lens. Both the slide holder and focusing mechanism can be moved in different positions along the optical axis to focus and clarify the image exposed to the light that is shown on the retinal screen of the device. A vernier lens is also included as part of the focusing mechanism to simulate accommodation as needed. The device can also be used to simulate ocular pathology.

6 Claims, 2 Drawing Sheets

APPARATUS ILLUSTRATING VISION DISORDERS AND CONDITIONS

BACKGROUND OF THE INVENTION

1. Field of the Invention

The present invention relates to an improved ocular apparatus used to illustrate common ocular disorders such as nearsightedness, farsightedness, astigmatism and presbyopia.

2. Description of the Related Art

Optical and ophthalmological models are often used to depict the various workings of the eye. The science of ophthalmology extends back to the early twentieth century, when the earliest models of the eye were developed. These early models of the eye, as well as more recent and sophisticated models are outlined in the related art.

U.S. Pat. No. 1,476,621 issued to Kintner outlines an optical demonstrating apparatus for demonstrating the movements of the human eye. The apparatus makes a provision for the simulation of the action of the principal cords or muscles whereby the eyeballs are rotated on their optical axes. It is possible to ocularly demonstrate muscular imbalances such as diplopia and other conditions using this apparatus.

U.S. Pat. No. 1,722,518 issued to Desmond outlines a device for showing the relationship of the focal point of a ray of light entering the eye with respect to the retina of the eye for various angular positions of a person's vision. Specifically, the device shows the relationship of the focal point of a ray of light entering the human eye through the marginal and central portions of an ophthalmic lens situated in front of the eye.

U.S. Pat. No. 1,832,603 issued to Witt outlines a relatively simple device for providing various states of the eye and optical effects such as nearsightedness and farsightedness. The device is not capable, however, of illustrating varying degrees of nearsightedness and farsightedness and does not illustrate the relatively common ocular condition of astigmatism.

U.S. Pat. No. 2,136,735 issued to Dunn outlines the use of a dioptermeter for demonstrating the refractive errors of the human eye. The dioptermeter is also used in checking whether the curvature of a given lens, as measured, corresponds to its correct prescription.

U.S. Pat. No. 3,177,593 issued to Loeb outlines a model of the human eye that may function as an ophthalmological display and teaching device for illustrating external and internal pathological conditions of the eye. This device is able to accommodate different strengths of corneal lenses and their respective visual effects as part of the model.

U.S. Pat. No. 3,905,130 issued to Gorgon et al. outlines the use of an ophthalmological training and evaluator simulator (in the form of a working manikin) and, more particularly, to a system for simulating an actual ophthalmological examination on a human eye with the capability of readily offering a large number of bilateral diverse funduscopic eyeground presentations for observation with an ophthalmoscope.

U.S. Pat. No. 4,943,151 issued to Cushman outlines the use of a Scheiner-principle vernier optometer apparatus for measuring the resting state of accommodation of a person in a darkened environment.

U.S. Pat. No. 5,221,208 issued to Alexander outlines the use of a teaching aid for those learning to use an ophthalmoscope. The teaching aid has a chamber with a first generally hemispherical wall formed with an aperture through which a photographic image of the retinal surface of an eye located in the chamber may be viewed.

All of the patents outline the use of important ophthalmological devices. Out of all of the devices outlined in the previous patents, only the device outlined in the Witt patent illustrate what basic ophthalmology disorders such as nearsightedness and farsightedness are. What is really needed is an improved prototype or model that better physically illustrates some common ocular disorders such as nearsightedness, farsightedness, astigmatism and presbyopia in varying degrees. That is what is really needed in the related art.

None of the above inventions and patents, taken either singularly or in combination, is seen to describe the instant invention as claimed.

Thus an apparatus illustrating vision disorders and conditions solving the aforementioned problems is desired.

SUMMARY OF THE INVENTION

The invention relates to an improved ocular device used to illustrate common ocular disorders such as nearsightedness, farsightedness, astigmatism and presbyopia. The device includes a light source that forms an optical axis across the length of the device and is subjected to a slide holder and a focusing mechanism. The slide holder exposes an inverted image to the light source, which is then exposed to a corneal lens and vernier lens. Both the slide holder and focusing mechanism can be moved in different positions along the optical axis to focus and clarify the image exposed to the light that is shown on the retinal screen of the device. A vernier lens is also included as part of the focusing mechanism to simulate the accommodation of the crystalline lens.

Accordingly, it is a principal object of the invention to provide an improved optical demonstration model that shows a variety of ocular disorders and how they can be corrected.

It is a further object of the invention to provide an optical demonstration model illustrating what astigmatism is.

Still another object of the invention is to show varying degrees of nearsightedness, farsightedness, astigmatism and presbyopia.

It is an object of the invention to provide improved elements and arrangements thereof for the purposes described which is inexpensive, dependable and fully effective in accomplishing its intended purposes.

It is an object of the invention to project images of simulated ocular pathology These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
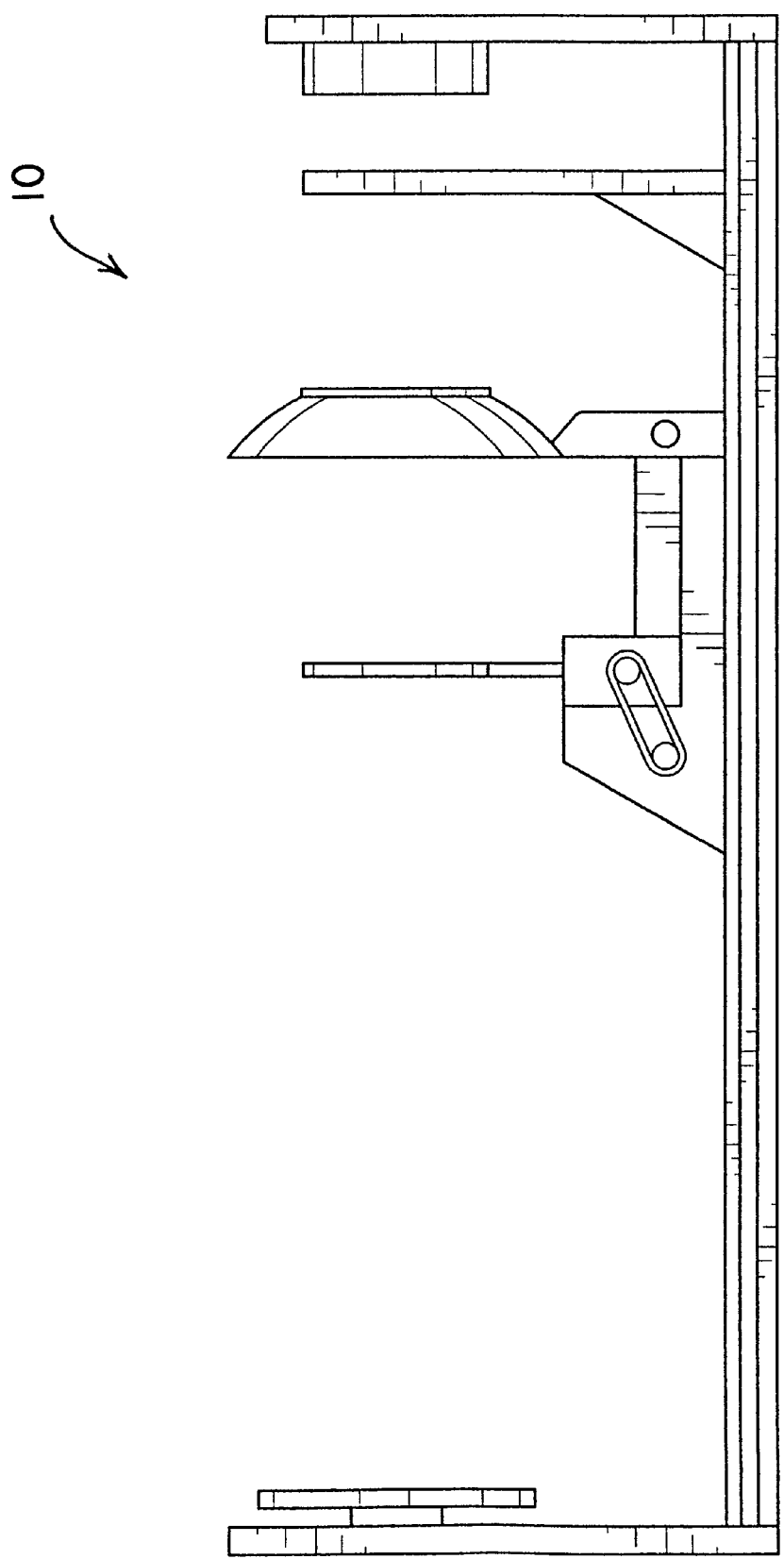
FIG. 1 is an environmental, perspective view of a apparatus illustrating vision disorders and conditions according to the present invention.
Figure 2:
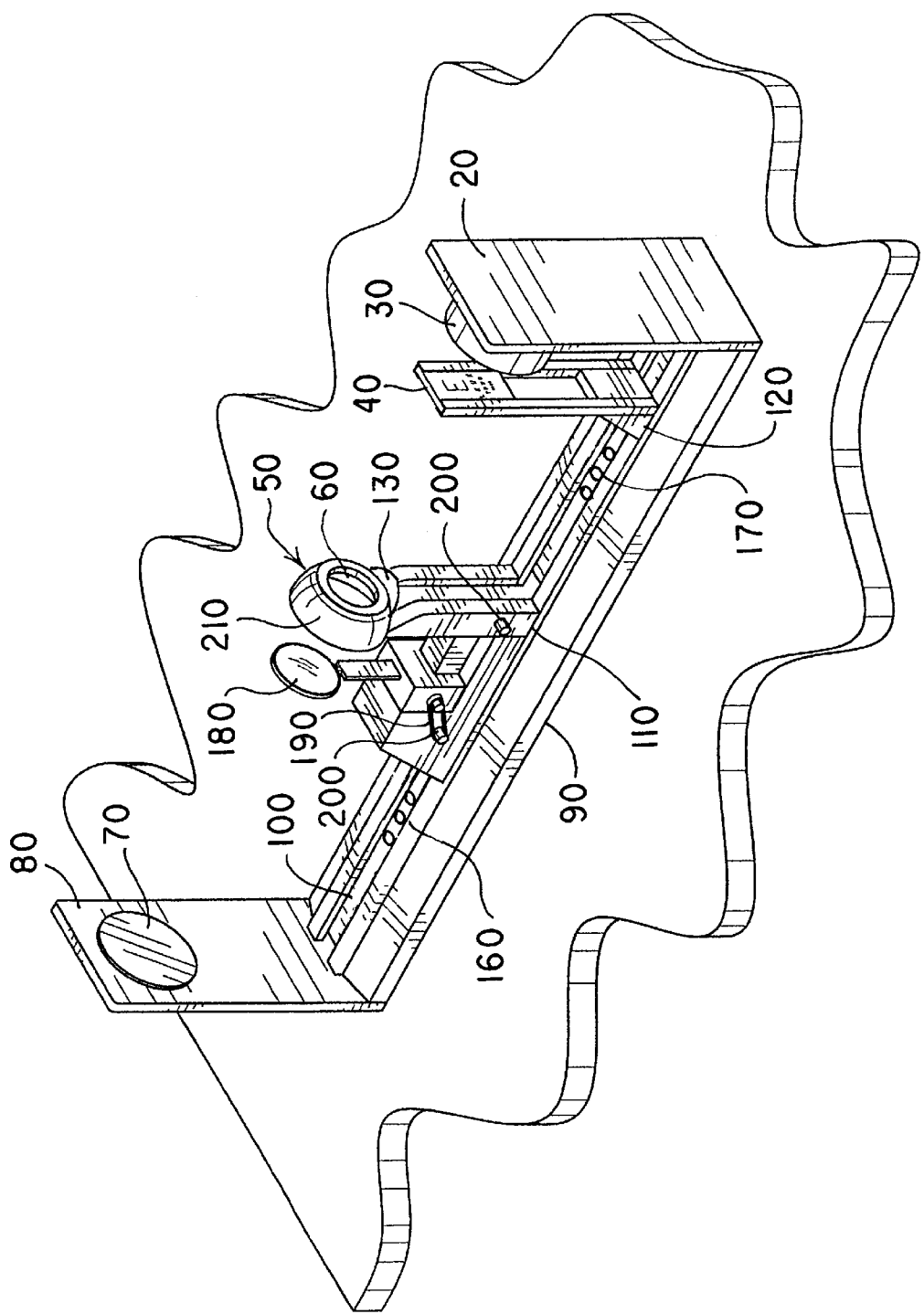
FIG. 2 is a side perspective view of an apparatus illustrating vision disorders and conditions according to the present invention.

The present invention is an apparatus illustrating vision disorders and conditions 10, as illustrated in FIG. 1.

The apparatus 10 comprises a front support 20, a light source 30 attached inside the front support that is illuminated along an optical axis across the length of the apparatus 10, a slide holder 40 that holds a transparent slide image with an adjusting means for varying the distance between the slide holder 40 and the light source 30, a focusing mechanism 50 with a corneal lens 60, a vernier adjustment means and a second adjusting means for varying the distance between the slide holder 40 and the focusing mechanism 50.

There is also a retinal screen 70 (which may be concave) and a back support 80 that receives the illuminated light source 30 after being transmitted through the slide holder 40 and the focusing mechanism 50 and a base 90 that serves as a bottom for the front wall 20, the light source 30, the slide holder 40, the focusing mechanism 50, the retinal screen 70 and the back wall 80. A channel 100 is provided on top of the base 90, with the slide holder 40 and focusing mechanism 50 each having a railing bottom 110,120 that is set in the channel 100 that is manually moved along the base 90.

The focusing mechanism 50 is provided with either a front beveled ledge 130 or other retaining device to accommodate the placement of supplemental lenses (not shown) that can be incorporated to simulate various refractive disorders. The focusing mechanism 50 could be provided with a thumbscrew (not shown) to assist in moving the focusing mechanism 50 along the channel 100 and to lock the focusing mechanism into place. A similar thumbscrew (not shown) is also provided on the slide holder 40 to assist in moving the slide holder 40 into different positions on the channel 100 and to lock the slide holder 40 into place.

The apparatus 10 adjusting means is a railing bottom 110 that is set in the channel 100 of the base 90 with the railing bottom 110 containing a separate bullet catch and bullet stops 160 being provided on the channel 100. The bullet stops 160 can correspond to predetermined settings for various often used measurements set by the user. Similarly, the railing bottom 120 of the slide holder 40 will also contain a separate bullet catch for a second set of bullet stops 170 for predetermined settings often used on the slide holder 40.

The apparatus 10 vernier adjustment means is a vernier lens 180 that is adjustably connected to the front or back of the focusing mechanism 50 by a rubber band or elastic device 190 and various studs incorporated on the focusing mechanism 50. The vernier lens 180 serves to simulate accommodation that is present in a younger eye and can be adjusted forward or backward depending on the formation of the rubber band or elastic device 190 and the studs 200. A conjunctiva 210 is also provided around the corneal lens 60, which actually simulates a conjunctiva and cornea present in a working authentic eye.

Operation of the apparatus 10 simulates how the eye and various optical lenses work. A transparent slide of an object, such as an eye chart, is placed in the slide holder 40 and is illuminated with a light source 30 that forms an optical axis (not shown) across the length of the apparatus 10. The optical axis is subjected to the corneal lens 60 and vernier lens 180 and displays an optical image of the slide in the slide holder 40 on the retinal screen 70. The image on the retinal screen 70 indicates the clarity and focus that the retina of an actual eye would have.

Moving the focusing mechanism 50, vernier lens 180 and slide holder 40, ocular conditions such as nearsightedness, farsightedness and presbyopia can be simulated using the apparatus 10. Lenses can be placed in front of or in back of the corneal lens 60, which could simulate the effects that corrective lenses such as eye glasses and contact lenses. The ocular condition of astigmatism can be simulated by simply replacing the cornea lens with an astigmatic lens.

A second embodiment of the apparatus 10 is also provided, wherein indicia (not shown) is placed on the base 90 of the apparatus 10 to indicate the varying focal length of the lenses. This can be used in lieu of or in combination with the bullet stops discussed earlier in this application.

It is to be understood that the present invention is not limited to the embodiments described above, but encompasses any and all embodiments within the scope of the following claims.

I claim:

1. An apparatus illustrating vision disorders and conditions comprising:

a front support;

a light source attached inside the front support, and illuminating light along an optical axis across the length of the apparatus;

a slide holder that holds a transparent slide image with an adjusting means for varying the distance between the slide holder and the light source;

a focusing mechanism with a corneal lens, a vernier adjustment means and a second adjusting means for varying the distance between the slide holder and the focusing mechanism;

a retinal screen and a back support that receives the illuminated light source after being transmitted through the slide holder and the focusing mechanism; and a base that serves as a bottom for the front wall, the light source, a channel, the slide holder, the focusing mechanism, the retinal screen and the back wall.

2. The apparatus according to claim 1, wherein said focusing mechanism is provided with a front beveled ledge or other retaining device to accommodate the placement of supplemental lenses.

3. The apparatus according to claim 1, wherein said adjusting means is a railing bottom that is set in the channel of the base with a bullet catch provided on the second railing bottom and bullet stops provided on the track.

4. The apparatus according to claim 1, wherein said vernier adjustment means is a vernier lens that is adjustably connected to the front and back of the focusing mechanism by a rubber band or other elastic device and various studs incorporated on the focusing mechanism.

5. The apparatus according to claim 1, wherein said second adjusting means is a second railing bottom that is attached to the focusing mechanism.

6. The apparatus according to claim 1, wherein indicia is placed on the base of the apparatus to coincide with the varying power of different lenses.

* * * * *